(12) United States Patent
Shimizu

(10) Patent No.: US 11,915,519 B2
(45) Date of Patent: Feb. 27, 2024

(54) INFORMATION PROCESSING SYSTEM, METHOD FOR MANAGING OBJECT TO BE AUTHENTICATED, AND PROGRAM

(71) Applicant: NEC Corporation, Tokyo (JP)

(72) Inventor: Yuki Shimizu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/860,648

(22) Filed: Jul. 8, 2022

(65) Prior Publication Data

US 2022/0343682 A1 Oct. 27, 2022

Related U.S. Application Data

(63) Continuation of application No. 16/699,895, filed on Dec. 2, 2019, now Pat. No. 11,410,461.

(30) Foreign Application Priority Data

Dec. 4, 2018 (JP) ................................. 2018-227464

(51) Int. Cl.
*G06V 40/16* (2022.01)
*G06F 21/32* (2013.01)

(52) U.S. Cl.
CPC ............ *G06V 40/172* (2022.01); *G06F 21/32* (2013.01)

(58) Field of Classification Search
CPC .... G06K 9/00288; G06F 21/32; G06V 40/00; G06V 40/40; G06V 40/50; G06V 40/70; G06V 40/20; G06V 40/10; G06V 40/172; G06V 40/16; G06V 40/161; G06V 40/168; G06V 40/174; G06V 40/178; G06V 40/179; G06V 40/18
See application file for complete search history.

(56) References Cited

U.S. PATENT DOCUMENTS

2004/0165754 A1    8/2004   Tabata
2009/0060295 A1    3/2009   Inoue et al.
(Continued)

FOREIGN PATENT DOCUMENTS

| JP | 2004-054788 A | 2/2004 |
|---|---|---|
| JP | 2007-249588 A | 9/2007 |

(Continued)

OTHER PUBLICATIONS

Japanese Office Action for JP Application No. 2020-159723 dated Sep. 28, 2021 with English Translation.
(Continued)

*Primary Examiner* — Ruiping Li

(57) ABSTRACT

A group to be authenticated in face authentication is efficiently registered in a system. An information processing system includes a face detection unit configured to detect a face from an image in which a plurality of faces of persons are shown, a determination unit configured to determine whether or not the face detected by the face detection unit satisfies a predetermined condition, and a registration information generation unit configured to generate registration information, the registration information being information in which a partial image of each of a plurality of faces that have been determined to satisfy the predetermined condition is associated with an identifier identifying a group to be authenticated in face authentication.

17 Claims, 13 Drawing Sheets

(56) References Cited

U.S. PATENT DOCUMENTS

| | | | |
|---|---|---|---|
| 2011/0249904 A1 | 10/2011 | Mochizuki | G06K 9/6255 |
| | | | 382/225 |
| 2013/0058579 A1 | 3/2013 | Kawanishi et al. | |
| 2013/0136320 A1 | 5/2013 | Nishiguchi et al. | |
| 2016/0119535 A1* | 4/2016 | Ohara | G06V 40/166 |
| | | | 348/222.1 |
| 2017/0280045 A1 | 9/2017 | Nonaka | G03B 37/00 |
| 2017/0310928 A1 | 10/2017 | Nakano et al. | |

FOREIGN PATENT DOCUMENTS

| | | |
|---|---|---|
| JP | 2007-328590 A | 12/2007 |
| JP | 2008-252713 A | 10/2008 |
| JP | 2010-146522 A | 7/2010 |
| JP | 2013-089155 A | 4/2013 |
| JP | 2013-109430 A | 6/2013 |
| JP | 2013-114304 A | 6/2013 |
| JP | 5783009 B2 | 9/2015 |
| JP | 2016-063413 A | 4/2016 |
| JP | 2018-136731 A | 8/2018 |
| WO | 2011/148562 A1 | 12/2011 |
| WO | 2018/180588 A1 | 10/2018 |

OTHER PUBLICATIONS

Japanese Office Action for JP Application No. 2018-227464 dated Aug. 25, 2020 with English Translation.
Japanese Office Action for JP Application No. 2018-227464 dated Jan. 28, 2020 with English Translation.
JP Office Action for JP Application No. 2022-074941, dated Jul. 4, 2023 with English Translation.

* cited by examiner

INFORMATION PROCESSING SYSTEM, METHOD FOR MANAGING OBJECT TO BE AUTHENTICATED, AND PROGRAM

CROSS-REFERENCE TO RELATED APPLICATIONS

The present application is a continuation application of U.S. patent application Ser. No. 16/699,895 filed on Dec. 2, 2019, which claims the benefit of priority from Japanese Patent Application No. 2018-227464 filed on Dec. 4, 2018, the disclosures of all of which are incorporated in their entirety by reference herein.

TECHNICAL FIELD

The present disclosure relates to an information processing system, a method for managing an object to be authenticated, and a program.

BACKGROUND ART

In recent years, various systems using face authentication have been developed and they have been used in various ways. In a face authentication system, it is necessary to register face information of persons to be authenticated in advance in order to perform face authentication. In face authentication for identifying a person, a face image registered as an object to be authenticated is often registered on an individual basis. However, for example, in a stamp rally game in which a rule is defined such that a stamp is given to a group on the condition that all the members of that group have arrived at a predetermined point together, when the arrivals of participants are determined by face authentication, it is necessary to register face images on a group basis in advance.

As a technique related to such a circumstance, there is an authentication apparatus disclosed in Japanese Patent No. 5783009. In this authentication apparatus, a plurality of faces detected from an image are registered in association with each other.

However, when faces of persons to be authenticated are photographed outdoors or in a place where there are a large number of people, and a plurality of faces are simultaneously detected from the taken image and their face information is registered, there is a possibility that faces of persons other than those to be authenticated may also be in the taken image and hence their faces may be mistakenly associated with the faces of those to be authenticated. In such a case, it is necessary to change the shooting place and/or take face images again, thus making the registration time-consuming.

Further, as a related technique, there is an image information processing apparatus disclosed in International Patent Publication No. WO2011/148562. This image information processing apparatus forms a group that includes only some of a plurality of persons shown in the image based on the directions in which persons in the image are facing.

SUMMARY

In the apparatus described in Japanese Patent No. 5783009 or International Patent Publication No. WO2011/148562, it is impossible to efficiently register a group to be authenticated in face authentication in the system. One of the objects to be attained by example embodiments disclosed in this specification is to provide an information processing system, a method for managing an object to be authenticated, and a program capable of efficiently registering a group to be authenticated in face authentication in the system.

An information processing system according to a first aspect includes:
 a face detection unit configured to detect a face from an image in which a plurality of faces of persons are shown;
 a determination unit configured to determine whether or not the face detected by the face detection unit satisfies a predetermined condition; and
 a registration information generation unit configured to generate registration information, the registration information being information in which a partial image of each of a plurality of faces that have been determined to satisfy the predetermined condition is associated with an identifier identifying a group to be authenticated in face authentication.

A method for managing an object to be authenticated according to a second aspect includes:
 detecting a face from an image in which a plurality of faces of persons are shown;
 determining whether or not the detected face satisfies a predetermined condition; and
 generating registration information, the registration information being information in which a partial image of each of a plurality of faces that have been determined to satisfy the predetermined condition is associated with an identifier identifying a group to be authenticated in face authentication.

A program according to a third aspect causes a computer to execute:
 a face detection step of detecting a face from an image in which a plurality of faces of persons are shown;
 a determination step of determining whether or not the detected face satisfies a predetermined condition; and
 a registration information generation step of generating registration information, the registration information being information in which a partial image of each of a plurality of faces that have been determined to satisfy the predetermined condition is associated with an identifier identifying a group to be authenticated in face authentication.

BRIEF DESCRIPTION OF THE DRAWINGS

The above and other aspects, features and advantages of the present disclosure will become more apparent from the following description of certain example embodiments when taken in conjunction with the accompanying drawings, in which.

EXAMPLE EMBODIMENTS

<Outline of Embodiment>

Figure 1:
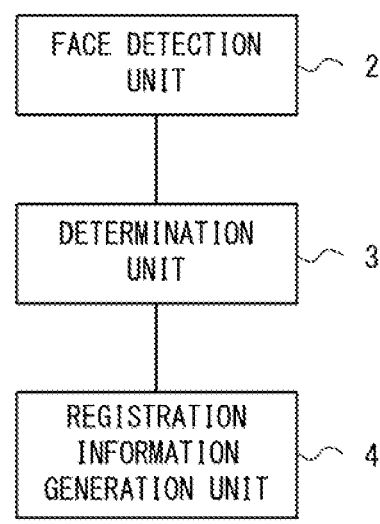
FIG. 1 is a block diagram showing an example of a configuration of an information processing system according to an outline of an example embodiment.

Prior to describing details of an example embodiment, an outline of an example embodiment is described. FIG. 1 is a block diagram showing an example of a configuration of an information processing system 1 according to an outline of an example embodiment. As shown in FIG. 1, the information processing system 1 includes a face detection unit 2, a determination unit 3, and a registration information generation unit 4.

The face detection unit 2 detects a face from an image in which a plurality of faces of persons are shown. The determination unit 3 determines whether or not the face detected by the face detection unit 2 satisfies a predetermined condition. The registration information generation unit 4 generates registration information which is information for managing objects to be authenticated in the face authentication system. The registration information generation unit 4 generates registration information by associating a partial image of each of a plurality of faces that have been determined to satisfy the predetermined condition by the determination unit 3 with an identifier identifying a group to be authenticated in the face authentication. That is, the registration information is information in which a partial image of each of a plurality of faces that have been determined to satisfy the predetermined condition is associated with an identifier identifying a group to be authenticated in the face authentication.

Note that the predetermined condition is an arbitrary condition for determining whether or not the detected face is a face of a person to be authenticated in the face authentication. Specifically, for example, as will be described later, the predetermined condition may be a condition of a direction of a line of sight, a condition of an orientation of a face (a face surface), a condition of a subject distance of a face, or a condition of a variation of a position of a face.

According to the information processing system 1, only a set of faces that have been determined to satisfy the predetermined condition among the faces included in the image is associated with the identifier for identifying the group to be authenticated. Therefore, it is possible to prevent a partial image of a face that does not satisfy the predetermined condition from being associated with the identifier. Accordingly, according to the information processing system 1, it is possible to generate appropriate registration information.

Consequently, it is possible to efficiently register a group to be authenticated in face authentication in the system.

<Details of Embodiment>

Next, details of example embodiments will be described.

<First Embodiment>

Figure 2:
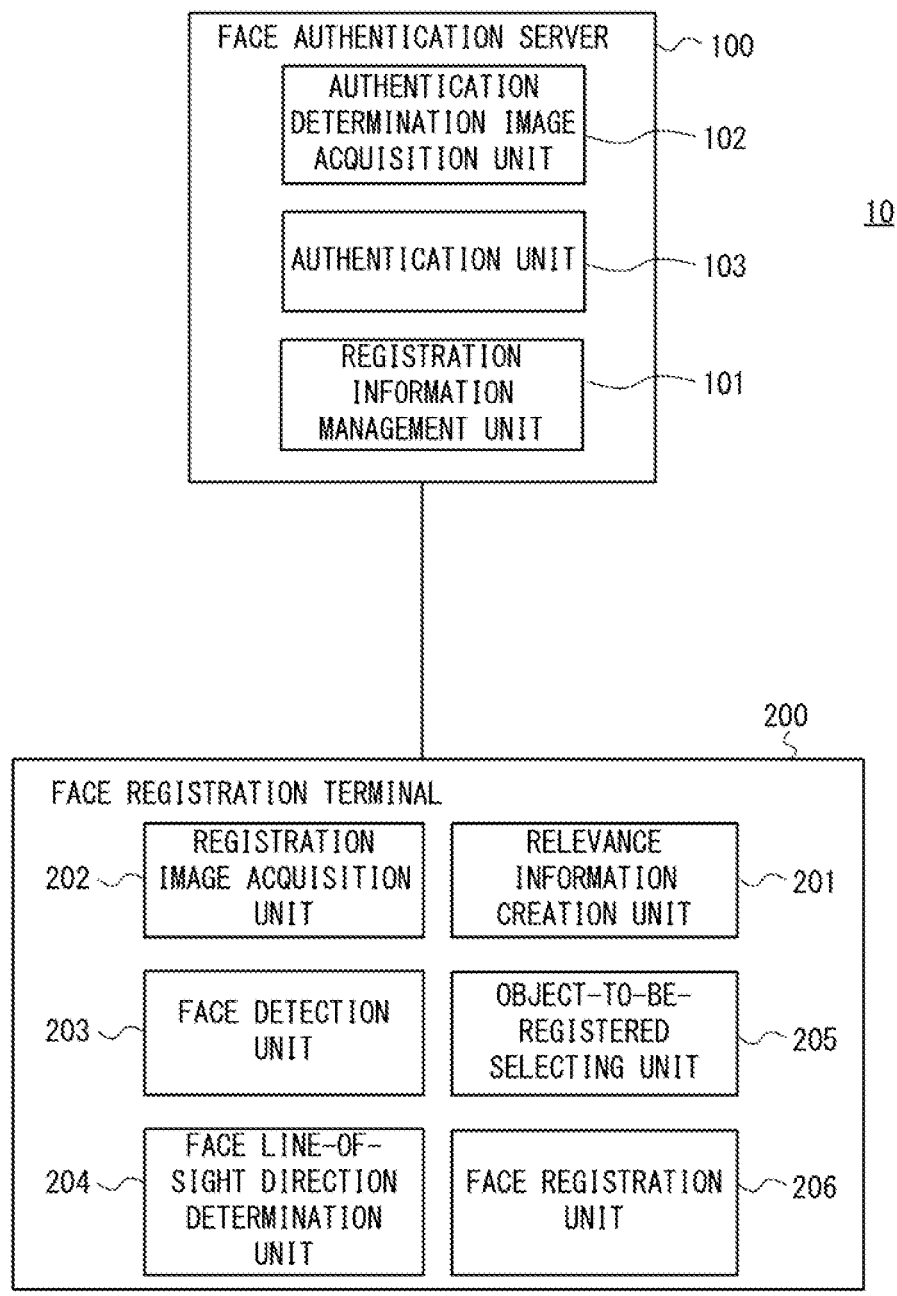
FIG. 2 is a block diagram showing an example of a configuration of an information processing system according to a first example embodiment.

FIG. 2 is a block diagram showing an example of a configuration of an information processing system 10 according to a first example embodiment. Note that the information processing system 10 corresponds to the information processing system 1 shown in FIG. 1. As shown in FIG. 2, the information processing system 10 includes a face authentication server 100 and a face registration terminal 200. The face authentication server 100 and the face registration terminal 200 are connected to each other through a cable or a wireless network so that they can communicate with each other.

The face authentication server 100 is an apparatus that performs a face authentication process. As shown in FIG. 2, the face authentication server 100 includes a registration information management unit 101, an authentication determination image acquisition unit 102, and an authentication unit 103.

The registration information management unit 101 manages the above-described registration information. That is, the registration information management unit 101 manages face images that have been registered in advance and will be used for comparison processes in the face authentication. Specifically, the registration information management unit 101 stores, in a storage device, a face image of each member belonging to a group to be authenticated in association with an identifier for identifying that group (hereinafter referred to as group ID), and manages the stored face images and the identifier. For example, the registration information management unit 101 stores the face images and the group ID in a storage device 54 of the face authentication server 100 (see FIG. 3). Note that the registration information management unit 101 receives registration information transmitted from the face registration terminal 200 and manages the received registration information.

The authentication determination image acquisition unit 102 acquires a face image for which a determination for face authentication is made. The authentication determination image acquisition unit 102 acquires, for example, a face image transmitted from other apparatuses (not shown).

The authentication unit 103 compares a face image acquired by the authentication determination image acquisition unit 102 with a face image managed as the registration information. By doing so, the authentication unit 103 authenticates a person (a member of the group) corresponding to each of face images associated with the same group ID. Note that the authentication unit 103 may output, as a final authentication result, information about whether or not all the members of the group have been successfully authenticated.

The face registration terminal 200 is a terminal apparatus that registers the above-described registration information in the face authentication server 100. As shown in FIG. 2, the face registration terminal 200 includes a relevance information creation unit 201, a registration image acquisition unit 202, a face detection unit 203, a face line-of-sight direction determination unit 204, an object-to-be-registered selecting unit 205, and a face registration unit 206.

When registration information for a new group is generated, the relevance information creation unit 201 issues a group ID for identifying that group. Specifically, the relevance information creation unit 201 creates an arbitrary ID that is not the same as any of the already-issued group IDs.

The registration image acquisition unit 202 acquires a face image that is used for generating the registration information for the new group (hereinafter referred to as a registration image). That is, the registration image acquisition unit 202 acquires an image including the faces of persons to be authenticated. The registration image is an image that is obtained by photographing the faces of all the members belonging to the group by a photographing apparatus such as a camera. However, there is a possibility that a person(s) other than the persons to be authenticated (the persons to be registered) is in the registration image. For example, the registration image acquisition unit 202 may acquire a face image transmitted from other apparatuses such as a photographing apparatus or may acquire a registration image by reading it from the storage device 54 disposed in the face registration terminal 200 (see FIG. 3).

The face detection unit 203 corresponds to the face detection unit 2 shown in FIG. 1.

The face detection unit 203 detects faced from the registration image acquired by the registration image acquisition unit 202. The face detection unit 203 detects areas in which persons' faces are shown by, for example, a publicly-known image recognition process.

The face line-of-sight direction determination unit 204 corresponds to the determination unit 3 shown in FIG. 1. The face line-of-sight direction determination unit 204 determines whether or not the direction of the line of sight of a face detected by the face detection unit 203 is a predetermined direction and the face (the face surface) faces in the predetermined direction. Note that the predetermined direction is, for example, the shooting direction. The shooting direction is a direction in which a photographing apparatus that takes images, such as a camera, is located. However, the shooting direction used here does not necessarily have to exactly coincide with the direction in which the photographing apparatus that takes images, such as a camera, is located. That is, the shooting direction may be any direction as long as the subject is considered to be facing the front. Therefore, the predetermined direction required as the direction of the line of sight also does not necessarily have to exactly coincide with the predetermined direction required as the direction of the face.

As described above, in this example embodiment, the face line-of-sight direction determination unit 204 determines whether or not the face detected by the face detection unit 203 faces in the shooting direction and its line of sight also points in the shooting direction. A state in which a face faces in the predetermined direction (the shooting direction) and its line of sight also points in the predetermined direction (the shooting direction) is referred to as a positive state. Further, a state in which a face does not face in the predetermined direction (the shooting direction) or its line of sight does not point in the predetermined direction (the shooting direction) is referred to as a negative state. That is, the face line-of-sight direction determination unit 204 determines whether each of all the faces detected by the face detection unit 203 is in a positive state or a negative state.

The face line-of-sight direction determination unit 204 makes such a determination by using, for example, a machine-learning technique. Specifically, for example, the face line-of-sight direction determination unit 204 makes a determination by using a model that has been learned by using learning data classified as a positive state and learning data classified as a negative state. The face line-of-sight direction determination unit 204 determines which state the image of a face detected by the face detection unit 203 is in by inputting the image into the above-described model.

Note that although the face line-of-sight direction determination unit 204 determines whether or not both the orientation of the face and the direction of the line of sight satisfy the condition, it may make a determination only for one of them. For example, the face line-of-sight direction determination unit 204 may determine only whether or not the direction of the line of sight of the face detected by the face detection unit 203 is the predetermined direction, or may determine only whether or not the orientation of the face detected by the face detection unit 203 is the predetermined direction. In other words, whether a face is in a positive state or a negative state may be defined only by the orientation of the face, or may be defined only by the direction of the line of sight.

The object-to-be-registered selecting unit 205 selects faces that should be registered as registration information from among all the faces detected by the face detection unit 203 (i.e., from among the partial images in which face parts cut out from the image acquired by the registration image acquisition unit 202 are shown). That is, the object-to-be-registered selecting unit 205 selects faces to be authenticated (faces to be registered) for the new group from among all the faces detected by the face detection unit 203. In this example embodiment, the object-to-be-registered selecting unit 205 selects, as objects to be registered, faces that have been determined to be in the positive state by the face line-of-sight direction determination unit 204.

The face registration unit 206 corresponds to the registration information generation unit 4 shown in FIG. 1.

The face registration unit 206 generates registration information by associating a partial image of each of a plurality of faces selected by the object-to-be-registered selecting unit 205 with a group ID created by the relevance information creation unit 201.

Further, the face registration unit 206 transmits the generated registration information to the face authentication server 100. The registration information transmitted to the face authentication server 100 is managed by the registration information management unit 101. In this way, the registration information is registered in the face authentication server 100.

Next, a hardware configuration of the face authentication server 100 and the face registration terminal 200 is described.

Figure 3:
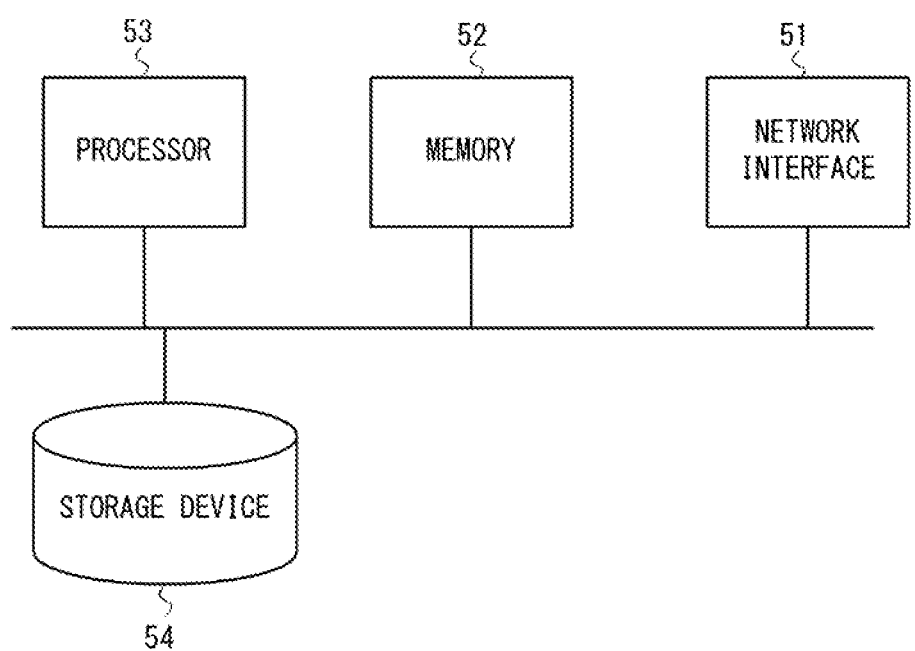
FIG. 3 is a block diagram showing an example of a hardware configuration of a face authentication server and a face registration terminal according to the first example embodiment.

FIG. 3 is a block diagram showing an example of a hardware configuration of the face authentication server 100 and the face registration terminal 200. Each of the face authentication server 100 and the face registration terminal 200 has a network interface 51, a memory 52, a processor 53, and a storage device 54. The face registration terminal 200 may be, for example, a personal computer, a tablet-type computer, or a smartphone. That is, the face registration terminal 200 is an arbitrary information processing apparatus having functions as a computer. Further, the face registration terminal 200 may include an image pickup apparatus (a camera) for providing a registration image to the registration image acquisition unit 202. Further, the image pickup apparatus may be connected to the face registration terminal 200 as an external apparatus of the face registration terminal 200.

The network interface 51 is used for communicating with other apparatuses. The network interface 51 may include, for example, a network interface card (NIC).

The memory 52 is formed of, for example, a combination of a volatile memory and a nonvolatile memory. The memory 52 is used to store software (a computer program) and the like including at least one instruction executed by the processor 53.

The program may be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a Compact Disc Read Only Memory (CD-ROM), CD-R, CD-R/W, and a semiconductor memory (such as a mask ROM, a Programmable ROM (PROM), an Erasable PROM (EPROM), a flash ROM, and a Random Access Memory (RAM)). These programs may be supplied to computers by using various types of transitory computer readable media. Examples of the transitory computer readable media include an electrical signal, an optical signal, and an electromagnetic wave. The transitory computer readable media can be used to supply programs to a computer through a wired communication line (e.g., electric wires and optical fibers) or a wireless communication line.

The processor 53 may be, for example, a microprocessor, an MPU (Micro Processor Unit), or a CPU (Central Processing Unit). The processor 53 may include a plurality of processors.

The processor 53 of the face authentication server 100 loads a computer program from the memory 52 and executes the loaded computer program, so that the process of each component of the face authentication server 100 shown in FIG. 2 is performed.

Further, the processor 53 of the face registration terminal 200 loads a computer program from the memory 52 and executes the loaded computer program, so that the process of each component of the face registration terminal 200 shown in FIG. 2 is performed.

The storage device 54 is a device that stores data and the like used for the processes and is composed of, for example, an HDD (Hard Disk Drive), a magnetic tape, an optical disk, or an SSD (Solid State Drive).

Figure 4:
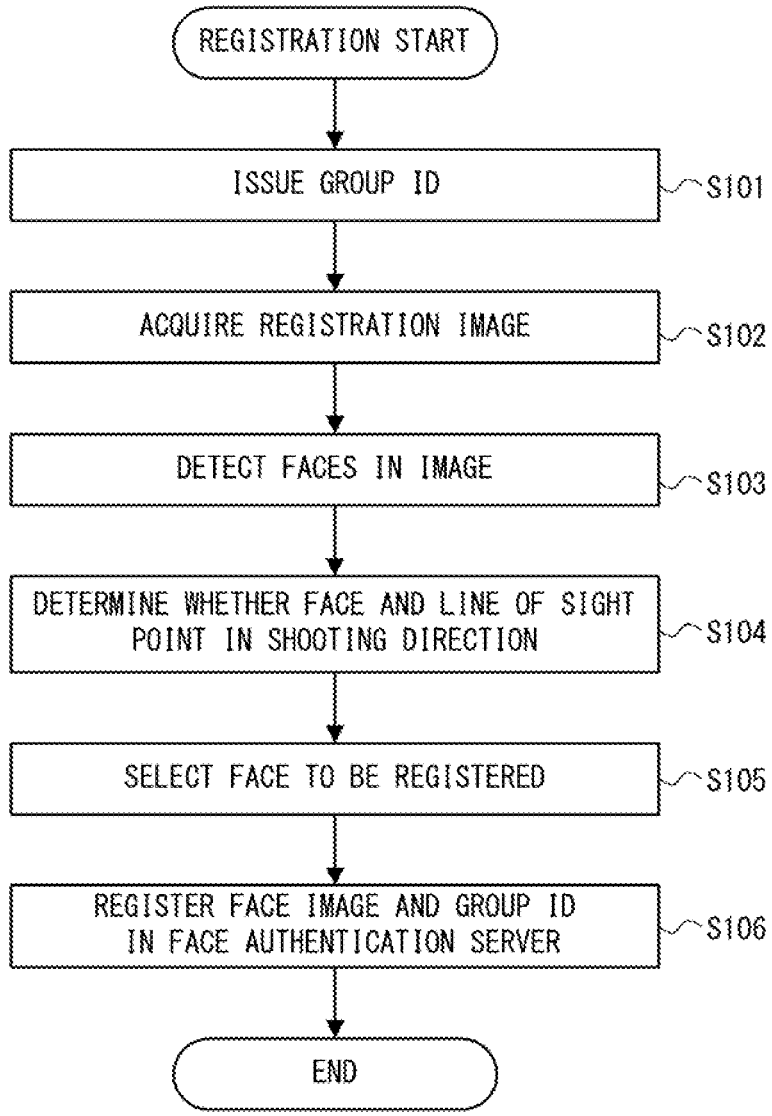
FIG. 4 is a flowchart showing an example of a registration process according to the first example embodiment.

Next, a flow of a registration process according to the first example embodiment is described. FIG. 4 is a flowchart showing an example of a registration process according to the first example embodiment. The flow of the registration process is described hereinafter with reference to FIG. 4.

In a step S101, the relevance information creation unit 201 issues a new group ID.

Next, in a step S102, the registration image acquisition unit 202 acquires a registration image for a new group.

Next, in a step S103, the face detection unit 203 detects all the faces in the registration image acquired in the step S102.

Next, in a step S104, the face line-of-sight direction determination unit 204 determines whether or not each of the faces detected in the step S103 is in a positive state.

Next, in a step S105, the object-to-be-registered selecting unit 205 selects faces to be registered from among all the faces detected in the step S103. Specifically, the object-to-be-registered selecting unit 205 selects, as the faces to be registered, the faces that have been determined to be in the positive state in the step S104.

Next, in a step S106, the face registration unit 206 generates registration information by associating a partial image of each of a plurality of faces selected in the step S105 with the group ID issued in the step S101. Then, the face registration unit 206 transmits the generated registration information to the face authentication server 100. In response to this, the registration information management unit 101 of the face authentication server 100 associates images that have been received as the registration information with the group ID and stores them in the storage device 54 of the face authentication server 100.

The first example embodiment has been described above. According to the information processing system 10 in accordance with the first example embodiment, the registration information is generated while associating only the set of faces that are in the positive state among the faces included in the registration image with the group ID. In general, when a registration image is taken, it is taken in a state in which the faces of the members of the group face the front and their lines of sight point in the direction of the photographing apparatus. Therefore, according to this example embodiment, even if a face(s) of a person(s) who should not be regarded as the object(s) to be registered is shown in the registration image, the faces of the members of the group can be efficiently extracted. That is, according to the information processing system 10, it is possible to generate appropriate registration information and thereby to efficiently register the group to be authenticated in the face authentication in the system.

<Second Embodiment>

Next, a second example embodiment is described. In the first example embodiment, as described above, it is determined whether or not the detected face is a face of a person to be registered based on the direction of the face and the line of sight. In such a case, there is a possibility that if a person who should not be regarded as the object to be registered, such as a passerby, accidentally satisfies the condition of the direction of the face and the line of sight, the face of that person is mistakenly included in the registration information. Therefore, a configuration in which a face that is inappropriate as the face to be registered can be excluded based on an instruction from a user is described.

Figure 5:
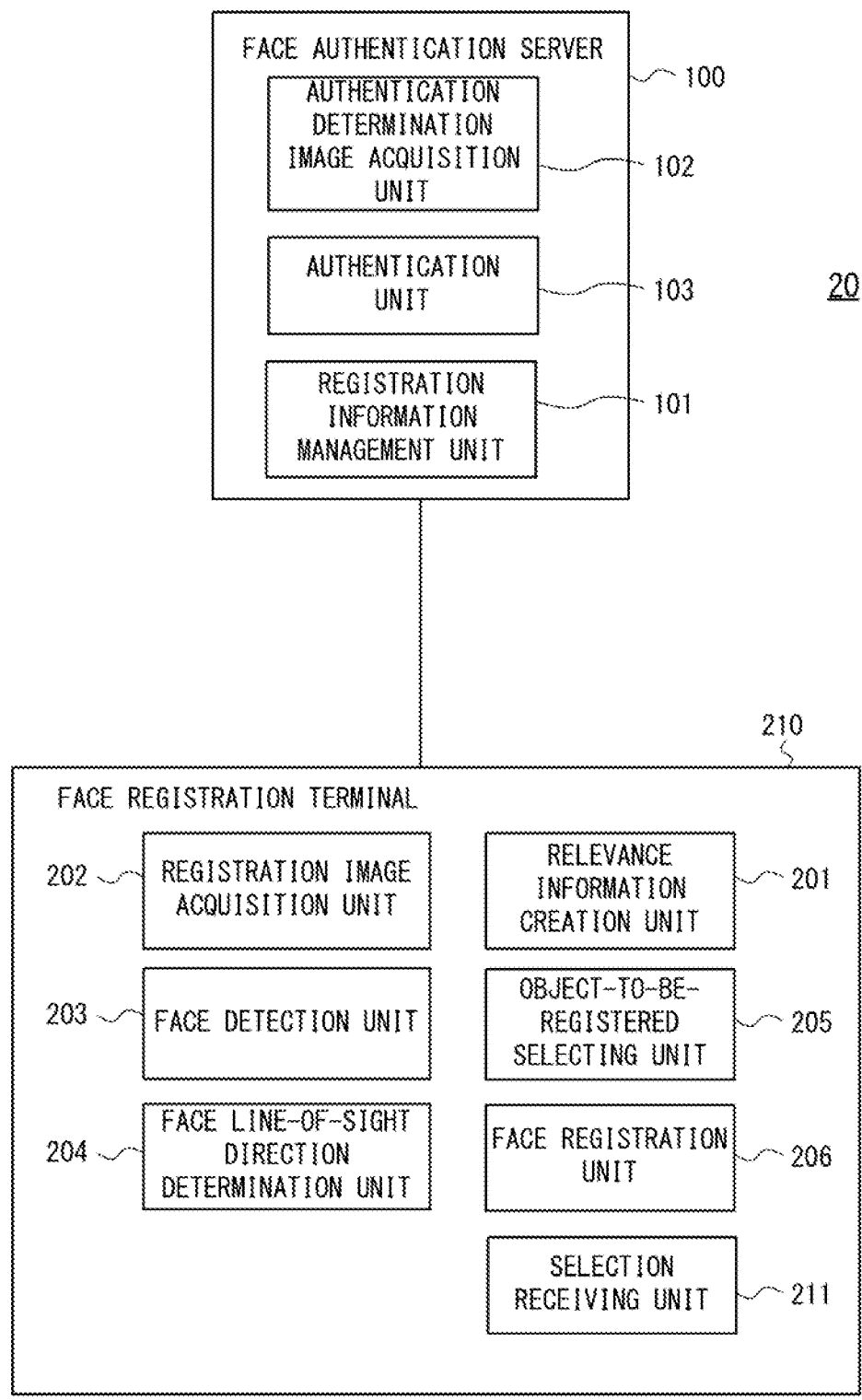
FIG. 5 is a block diagram showing an example of a configuration of an information processing system according to the second example embodiment.

FIG. 5 is a block diagram showing an example of a configuration of an information processing system 20 according to the second example embodiment. The information processing system 20 differs from the information processing system 10 according to the first example embodiment in that the face registration terminal 200 is replaced with a face registration terminal 210. In this example embodiment, the face authentication server 100 and the face registration terminal 210 are also connected to each other through a cable or a wireless network so that they can communicate with each other. Parts of the configuration and operations different from those of the first example embodiment will be described hereinafter while duplicated descriptions thereof are omitted.

Figure 6:
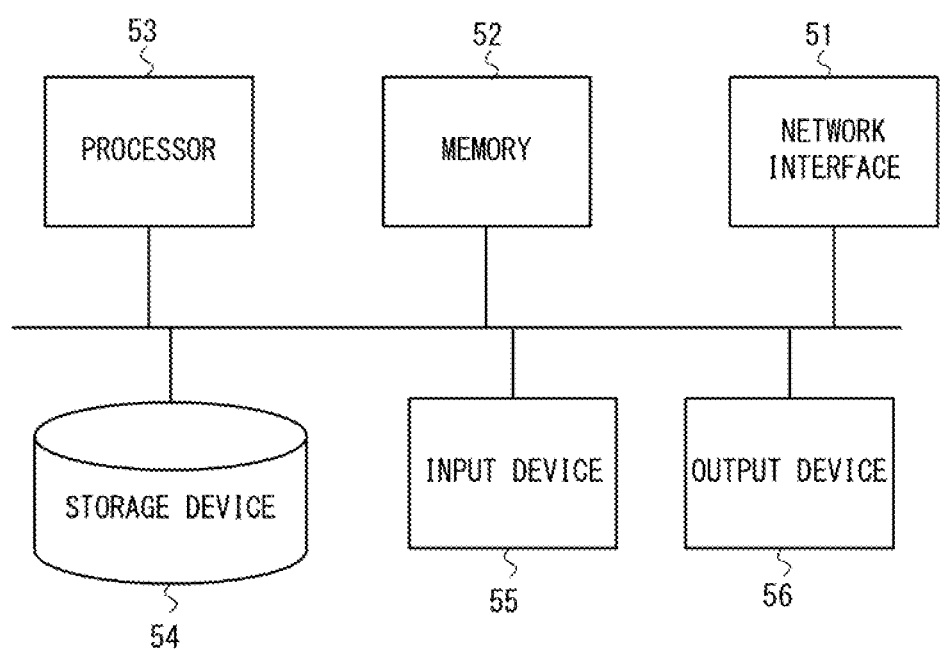
FIG. 6 is a block diagram showing an example of a hardware configuration of a face registration terminal according to the second example embodiment.

Further, FIG. 6 is a block diagram showing an example of a hardware configuration of the face registration terminal 210 according to the second example embodiment. As shown in FIG. 6, the face registration terminal 210 include, as hardware components, an input device 55 and an output device 56 in addition to the network interface 51, the memory 52, the processor 53, and the storage device 54.

The input device 55 is a device that receives an instruction input by a user. For example, the input device 55 is an input device such as a mouse or a keyboard. Further, the output device 56 is an output device that outputs information to the outside, such as a display device. Note that the input device 55 and the output device 56 may be integrally formed as a touch panel.

As shown in FIG. 5, the face registration terminal 210 includes a relevance information creation unit 201, a registration image acquisition unit 202, a face detection unit 203, a face line-of-sight direction determination unit 204, an object-to-be-registered selecting unit 205, a face registration unit 206, and a selection receiving unit 211. That is, the face registration terminal 210 differs from the face registration terminal 200 because it also includes the selection receiving unit 211. The process of each component of the face registration terminal 210 shown in FIG. 5 is performed as the processor 53 of the face registration terminal 210 loads a computer program from the memory 52 and executes the loaded program.

The selection receiving unit 211 receives, from a user, an instruction to select whether or not faces that have been determined to be in the positive state by the face line-of-sight direction determination unit 204, i.e., faces that have been determined to satisfy the predetermined condition should be regarded as objects to be authenticated (objects to be registered). Specifically, the selection receiving unit 211 receives, for example, an instruction from a user through the input device 55.

To be more specific, when the determinations for all the faces detected from the registration image by the face line-of-sight direction determination unit 204 are completed, the selection receiving unit 211 performs the following processes. The selection receiving unit 211 superimposes frames enclosing faces that have been determined to be in the positive state by the face line-of-sight direction determination unit 204 on the registration image and outputs the resultant image to the output device 56. A user selects faces that should be authenticated (should be registered) or faces that should be excluded from the objects to be authenticated (the objects to be registered) from among the faces enclosed by the frames. By doing so, the user inputs an instruction to select whether or not the faces should be regarded as objects to be authenticated (objects to be registered). As a result, the selection receiving unit 211 receives the instruction from the user. The selection receiving unit 211 notifies the object-to-be-registered selecting unit 205 of the received instruction.

The object-to-be-registered selecting unit 205 according to this example embodiment selects, as faces that should be included in the registration information, faces that have been selected as objects to be registered according to the instruction received by the selection receiving unit 211 from among faces that have been determined to be in the positive state by the face line-of-sight direction determination unit 204. That is, the face registration unit 206 according to this example embodiment generates registration information by associating partial images that have been selected according to an instruction from a user from among a plurality of partial images of respective faces that have been determined to satisfy the predetermined condition with a group ID.

Figure 7:
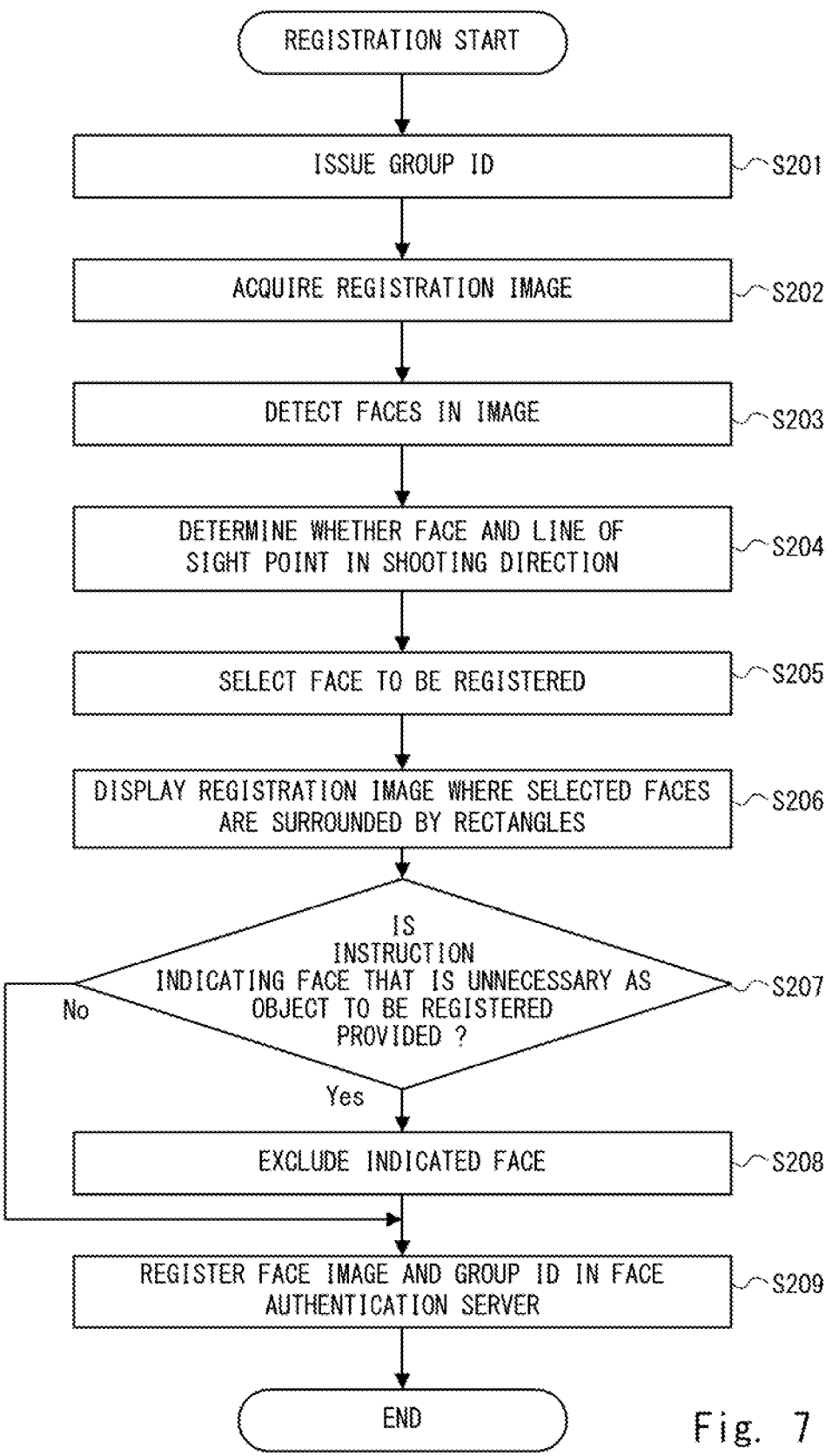
FIG. 7 is a flowchart showing an example of a registration process according to the second example embodiment.

Next, a flow of a registration process according to the second example embodiment will be described. FIG. 7 is a flowchart showing an example of a registration process according to the second example embodiment. The flow of the registration process is described hereinafter with reference to FIG. 7.

In a step S201, the relevance information creation unit 201 issues a new group ID.

Next, in a step S202, the registration image acquisition unit 202 acquires a registration image for a new group.

Next, in a step S203, the face detection unit 203 detects all the faces in the registration image acquired in the step S202.

Next, in a step S204, the face line-of-sight direction determination unit 204 determines whether or not each of the faces detected in the step S203 is in a positive state.

Next, in a step S205, the object-to-be-registered selecting unit 205 selects, from all the faces detected in the step S203, faces that have been determined to be in the positive state in the step S204 as candidates for objects to be registered.

Next, in a step S206, the selection receiving unit 211 displays a registration image in which the faces selected as the candidates for the objects to be registered in the step S205 are enclosed by frames. In response to this, for example, if there is a face(s) that is unnecessary as the object to be registered, a user makes an input to select the face(s).

Next, in a step S207, the selection receiving unit 211 determines whether or not the user has provided an instruction as to a face(s) that is unnecessary as the object to be registered. When the user has provided an instruction as to a face(s) that is unnecessary as the object to be registered (Yes at step S207), the process proceeds to a step S208. On the other hand, when the user has provided no instruction as to a face(s) that is unnecessary as the object to be registered (No at step S207), the process proceeds to a step S209.

In the step S208, the object-to-be-registered selecting unit 205 excludes, among the candidates for faces to be registered, the face(s) that has been indicated as an unnecessary face(s) by the user from the objects to be registered. After the step S208, the process proceeds to the step S209.

In the step S209, the face registration unit 206 generates registration information by associating a partial image of each of the faces that have not been excluded from the candidates for faces to be registered with the group ID issued in the step S201. Then, the face registration unit 206 transmits the generated registration information to the face authentication server 100. In response to this, the registration information management unit 101 of the face authentication server 100 associates images that have been received as the registration information with the group ID and stores them in the storage device 54 of the face authentication server 100.

The second example embodiment has been described above. According to the information processing system 20 in accordance with the second example embodiment, a user can provide an instruction as to whether or not faces that have been determined to be in the positive state should be regarded as objects to be registered. Therefore, even when the face of a person who should not be regarded as the object to be registered, such as a passerby, accidentally satisfies the predetermined condition for determining the object to be registered, registration information can be appropriately generated. Therefore, it is possible to register a group to be authenticated in face authentication more accurately.

Note that the selection of an image(s) based on a user's instruction described in this example embodiment is not limited to the first example embodiment. That is, it may also be combined with any of example embodiments described below.

<Third Embodiment>

Next, a third example embodiment is described. In the second example embodiment, when the face of a person who should not be regarded as the object to be registered, such as a passerby, accidentally satisfies the predetermined condition for determining the object to be registered, the face which is inappropriate for the registration is excluded based on an instruction from a user. In this example embodiment, a face(s) that is inappropriate for the registration is excluded by a method different from that in the second example embodiment.

Specifically, in this example embodiment, when faces of the same person in two or more registration images among a plurality of registration images that have been successively taken at predetermined time intervals (e.g., in all of the successively-taken registration images) are all in the positive state, they are regarded as the object to be registered.

Figure 8:
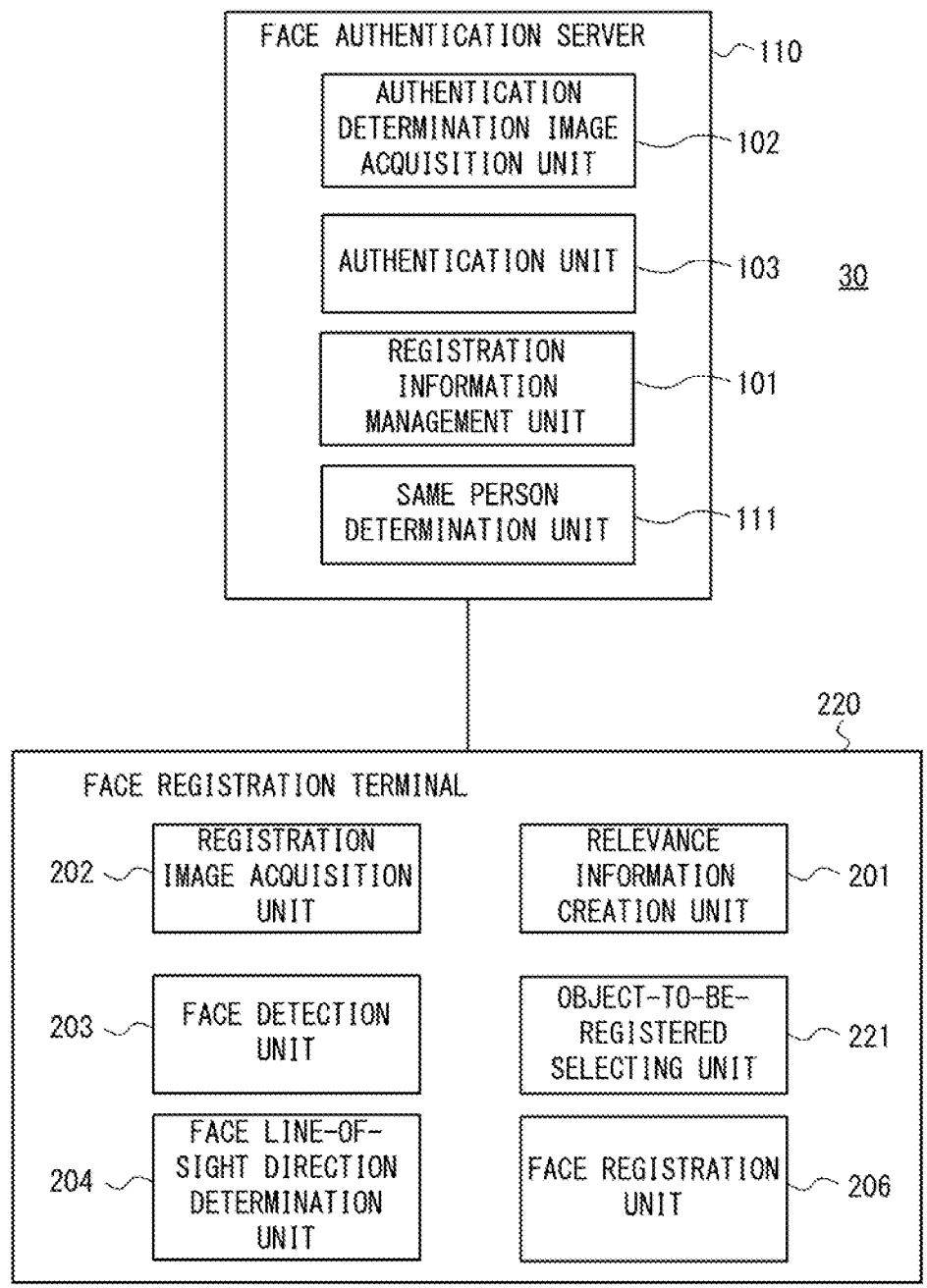
FIG. 8 is a block diagram showing an example of a configuration of an information processing system according to a third example embodiment.

FIG. 8 is a block diagram showing an example of a configuration of an information processing system 30 according to the third example embodiment. The information processing system 30 includes a face authentication server 110 and a face registration terminal 220. The face authentication server 110 and the face registration terminal 220 are connected to each other through a cable or a wireless network so that they can communicate with each other. The face authentication server 110 differs from the face authentication server 100 according to the first example embodiment because it includes a same person determination unit 111. Further, the face registration terminal 220 differs from the face registration terminal 200 according to the first example embodiment in that the object-to-be-registered selecting unit 205 is replaced with a object-to-be-registered selecting unit 221.

Note that a hardware configuration of the face authentication server 110 and the face registration terminal 220 is, for example, the same as that shown in FIG. 3. The process of each component of the face authentication server 110 shown in FIG. 8 is performed as the processor 53 of the face authentication server 110 loads a computer program from the memory 52 and executes the loaded program. Similarly, the process of each component of the face registration terminal 220 shown in FIG. 8 is performed as the processor 53 of the face registration terminal 220 loads a computer program from the memory 52 and executes the loaded program.

Parts of the configuration and operations different from those of the first example embodiment will be described hereinafter while duplicated descriptions thereof are omitted.

The registration image acquisition unit 202 according to this example embodiment acquires N registration images (N is an integer equal to or greater than two) that are successively taken at predetermined time intervals (e.g., intervals of several seconds). Then, the face detection unit 203 detects faces from each of a plurality of consecutive registration images acquired by the registration image acquisition unit 202. Then, the face detection unit 203 outputs partial images of the detected faces to the same person determination unit 111 of the face authentication server 110.

The same person determination unit 111 performs matching processes between registration images for the faces detected from the plurality of consecutive registration images. Note that the same person determination unit 111 performs the matching processes by using an arbitrary publicly-known image recognition process (a face recognition technique). Note that a function corresponding to that of the same person determination unit 111 may be provided by the authentication unit 103. The same person determination unit 111 associates faces that have been determined to match each other by the matching process with each other and regard them as the face of the same person. The same person determination unit 111 outputs the result of the association to the object-to-be-registered selecting unit 221 of the face registration terminal 220.

The object-to-be-registered selecting unit 221 checks whether all of the faces that have been extracted from M registration images, respectively, and associated with each other as the face image of the same person by the same person determination unit 111 have been determined to be in the positive state by the face line-of-sight direction determination unit 204. Note that M is an integer equal to or greater than two. For example, M is equal to N (M=N). Alternatively, M may be smaller than N (M<N). When all of the faces extracted from the M registration images are in the positive state, the object-to-be-registered selecting unit 221 selects a partial image of one of the faces extracted from these M registration images, respectively, as a partial image of a face to be registered. For example, the object-to-be-registered selecting unit 221 selects, as the partial image of the face to be registered, a partial image of a registration image that was taken earliest among the M registration images. The object-to-be-registered selecting unit 221 performs the above-described processes for the face images of all the persons for whom association has been made by the same person determination unit 111.

Note that the face line-of-sight direction determination unit 204 and the object-to-be-registered selecting unit 221 in this example embodiment correspond to the determination unit 3 shown in FIG. 1. Further, the face line-of-sight direction determination unit 204 and the object-to-be-registered selecting unit 221 determine whether or not a plurality of faces of the same person detected from a plurality of registration images are in the positive state. Then, the face registration unit 206 generates registration information by associating partial images of the faces of persons that have been determined to satisfy the predetermined condition (the positive state) for the plurality of faces detected from the plurality of registration images with the group ID.

Figure 9:
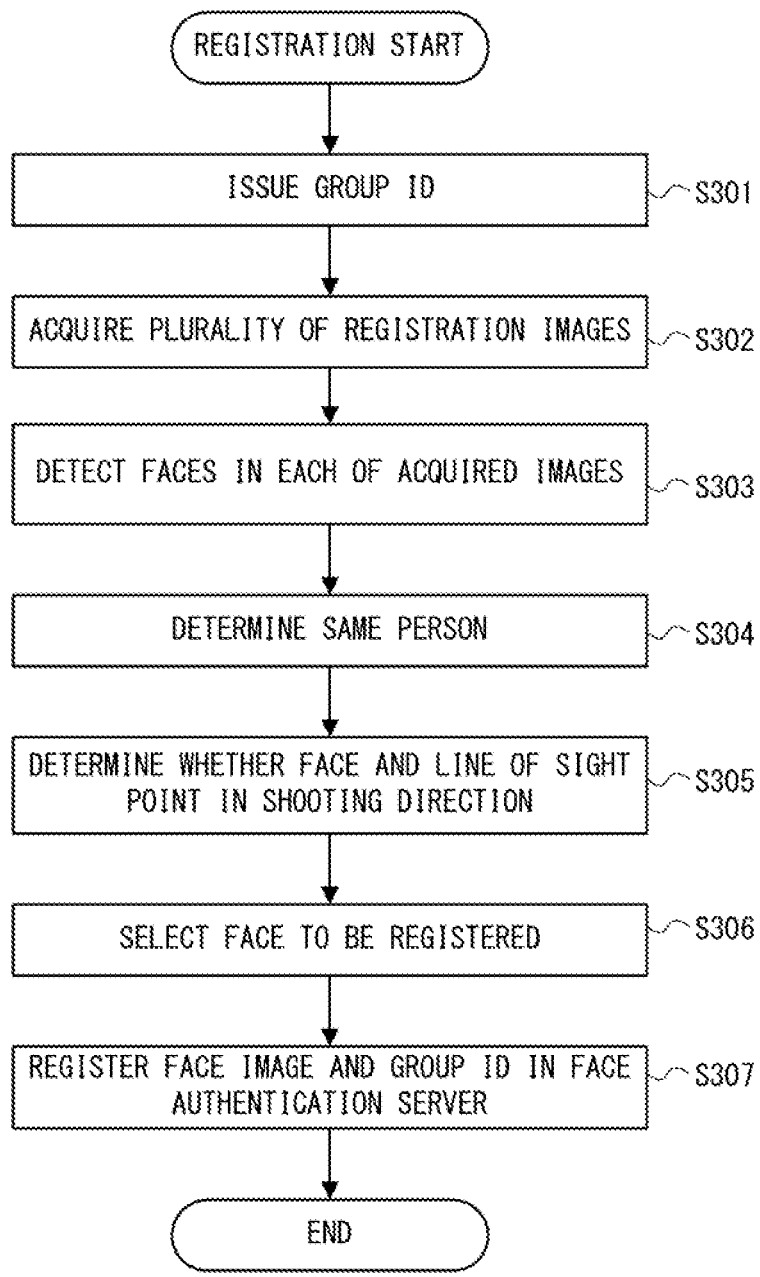
FIG. 9 is a flowchart showing an example of a registration process according to the third example embodiment.

Next, a flow of a registration process according to the third example embodiment will be described. FIG. 9 is a flowchart showing an example of a registration process according to the third example embodiment. The flow of the registration process is described hereinafter with reference to FIG. 9.

In a step S301, the relevance information creation unit 201 issues a new group ID.

Next, in a step S302, the registration image acquisition unit 202 acquires a plurality of registration images successively taken at predetermined time intervals (e.g., intervals of several seconds).

Next, in a step S303, the face detection unit 203 detects all the faces in the registration images acquired in the step S302. That is, the face detection unit 203 detects faces in all the registration images acquired in the step S302.

Next, in a step S304, the same person determination unit 111 performs matching processes between registration images for the faces detected in the step S303, and associates faces that have been determined to match each other by the matching process with each other and regard them as the face of the same person.

Next, in a step S305, the face line-of-sight direction determination unit 204 determines whether or not each of the faces detected in the step S303 is in a positive state.

Next, in a step S306, the object-to-be-registered selecting unit 221 determines whether all of the faces that have been extracted from M registration images, respectively, and associated with each other as the face image of the same person are in the positive state. Then, when all of the faces are in the positive state, the object-to-be-registered selecting unit 221 selects a partial image of one of the faces extracted from these M registration images, respectively, as a partial image of a face to be registered.

In a step S307, the face registration unit 206 generates registration information by associating partial images of the faces selected in the step S306 with the group ID issued in the step S301. Then, the face registration unit 206 transmits the generated registration information to the face authentication server 110. In response to this, the registration information management unit 101 of the face authentication server 110 associates images that have been received as the registration information with the group ID and stores them in the storage device 54 of the face authentication server 110.

The third example embodiment has been described above. It is expected that positive states of persons to be registered are maintained for a period during which photographing for a registration image is continued. In contrast, it is expected that the face of a person who is inappropriate for the registration, such as a passerby who happens to face the camera, is in a positive state only for a fleeting moment. According to the information processing system 30 in accordance with the third example embodiment, it is possible to determine whether or not a positive state is continued by using a plurality of successively-taken registration images. Therefore, even if the face of a person who should not be regarded as the object to be registered, such as a passerby, happens to be in a positive state, registration information can be appropriately generated. Therefore, it is possible to register a group to be authenticated in face authentication more accurately.

<Fourth Embodiment>

In the above-described example embodiments, a face to be registered is selected according to whether or not a face detected from the registration image is in a positive state. In contrast to this, in this example embodiment, a face to be registered is selected based on the distance between the photographing apparatus and the subject at the time when the registration image is taken.

Figure 10:
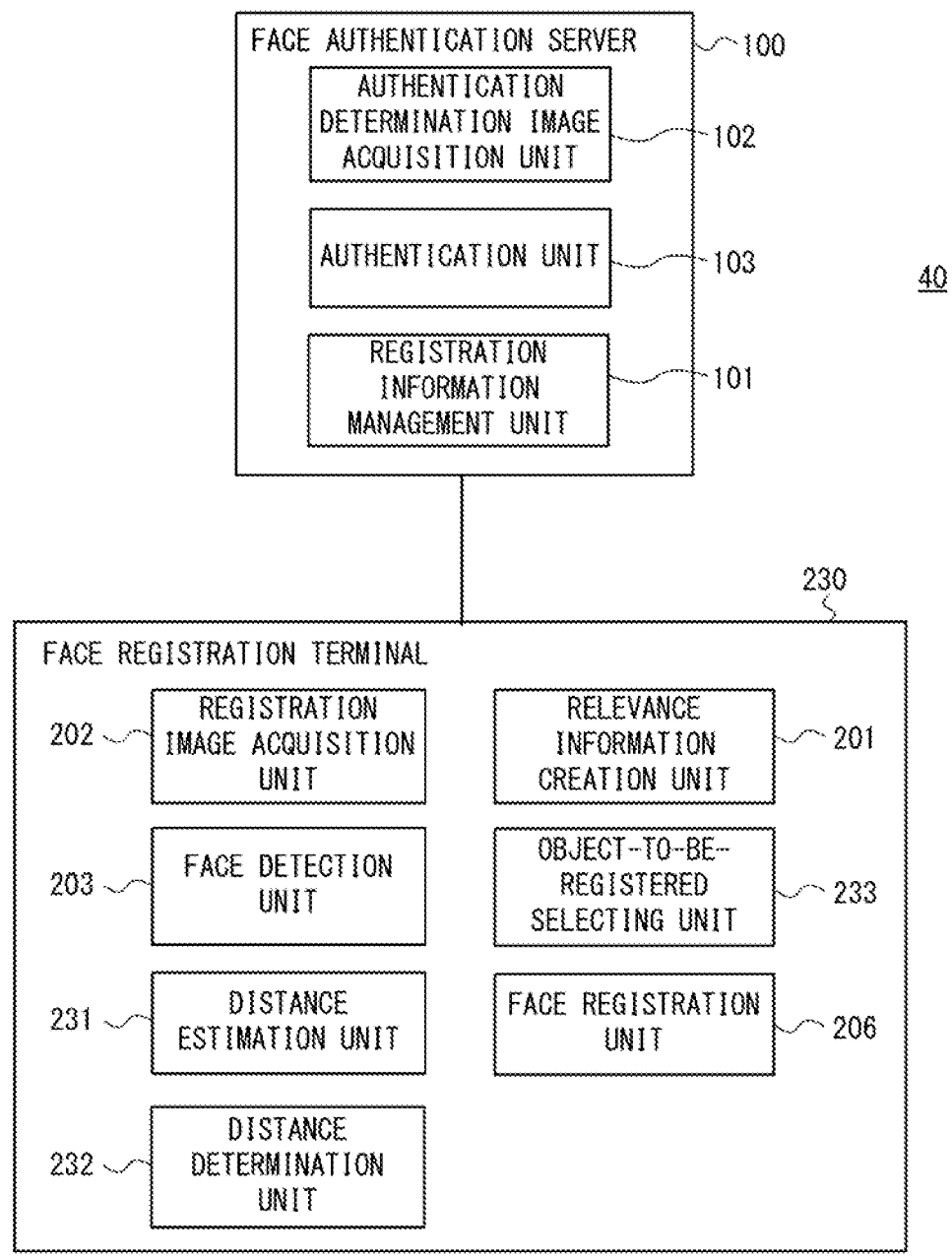
FIG. 10 is a block diagram showing an example of a configuration of an information processing system according to a fourth example embodiment.

FIG. 10 is a block diagram showing an example of a configuration of an information processing system 40 according to a fourth example embodiment. The information processing system 40 differs from the information processing system 10 according to the first example embodiment in that the face registration terminal 200 is replaced with a face registration terminal 230. In this example embodiment, the face authentication server 100 and the face registration terminal 230 are also connected to each other through a cable or a wireless network so that they can communicate with each other.

The face registration terminal 230 differs from the face registration terminal 200 according to the first example embodiment because a distance estimation unit 231 and a distance determination unit 232 are provided in place of the face line-of-sight direction determination unit 204, and a object-to-be-registered selecting unit 233 is provided in place of the object-to-be-registered selecting unit 205.

Note that a hardware configuration of the face registration terminal 230 is, for example, the same as that shown in FIG. 3. The process of each component of the face registration terminal 230 shown in FIG. 10 is performed as the processor 53 of the face registration terminal 230 loads a computer program from the memory 52 and executes the loaded program.

Parts of the configuration and operations different from those of the first example embodiment will be described hereinafter while duplicated descriptions thereof are omitted.

The distance estimation unit 231 estimates a subject distance of each face detected by the face detection unit 203. For example, the distance estimation unit 231 estimates the subject distance of each of the faces that have been detected by performing a publicly-known image analysis process for the partial images of the faces detected by the face detection unit 203. For example, the distance estimation unit 231 may estimate the subject distance based on the length of a predetermined part of the body (e.g., a distance between the eyes). In such a case, the longer the length of the predetermined part of the body is, the shorter the subject distance is estimated. Note that the predetermined part of the body may be, for example, the entire face, a part of the face (e.g., a nose, an eye(s), an ear(s), etc.), or a part of the body other than the face (e.g., a shoulder(s), a neck, etc.). Note that the technique for estimating the subject is not limited to the above-described estimation method. That is, other publicly-known estimation techniques may be used.

The distance determination unit 232 corresponds to the determination unit 3 shown in FIG. 1. The distance determination unit 232 determines whether or not the subject distance estimated by the distance estimation unit 231 satisfies a predetermined distance condition. That is, as the determination as to whether or not the predetermined condition is satisfied, the distance determination unit 232 determines whether or not the subject distance of a face detected by the face detection unit 203, estimated from the face satisfies the predetermined distance condition. In this example embodiment, the distance determination unit 232 defines the shortest one of the subject distances of faces obtained from the registration image as a reference distance and determines, for each of the subject distances of the faces obtained from the registration image, whether or not a difference between that subject distance of that face and the reference distance is equal to or shorter than a predetermined threshold. For each of the faces obtained from the registration image, the distance determination unit 232 outputs a determination result indicating whether or not the difference between the subject distance of that face and the reference distance is equal to or shorter than the predetermined threshold to the object-to-be-registered selecting unit 233.

The object-to-be-registered selecting unit 233 selects, as objects to be registered, partial images of faces of which the subject distances have been determined to satisfy the above-described condition by the distance determination unit 232. It is expected that when a registration image is taken, the members of the group are present close to each other in the shooting direction. Therefore, by determining whether or not the difference between the subject distance and the reference distance is equal to or shorter than the predetermined threshold, it is possible to exclude a face(s) of a person(s) who is inappropriate for the registration, such as a passerby present away from the members of the group.

Note that the above-described distance condition is merely an example. That is, the distance determination unit 232 may make a determination by using other distance conditions. For example, the distance determination unit 232 may determine whether or not the subject distance estimated by the distance estimation unit 231 is equal to or shorter than a predetermined threshold. It is expected that photographing for a registration image is performed in an environment in which the subject distance is equal to or shorter than a predetermined distance. Therefore, by determining whether or not the subject distance is equal to or shorter than the predetermined threshold, it is possible to exclude a face(s) of a person(s) who is inappropriate for the registration, such as a passerby present away from the photographing apparatus.

Figure 11:
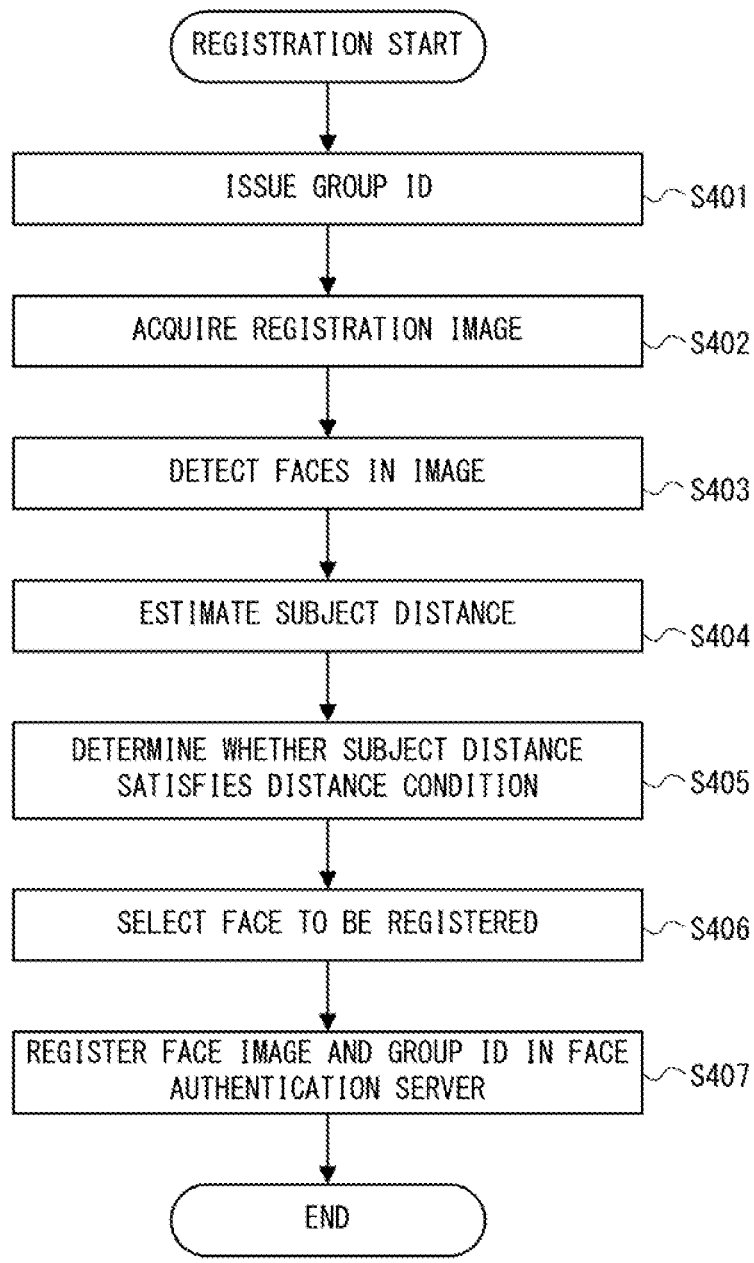
FIG. 11 is a flowchart showing an example of a registration process according to the fourth example embodiment.

Next, a flow of a registration process according to the fourth example embodiment will be described. FIG. 11 is a flowchart showing an example of a registration process according to the fourth example embodiment. The flow of the registration process is described hereinafter with reference to FIG. 11.

In a step S401, the relevance information creation unit 201 issues a new group ID.

Next, in a step S402, the registration image acquisition unit 202 acquires a registration image for a new group.

Next, in a step S403, the face detection unit 203 detects all the faces in the registration image acquired in the step S402.

Next, in a step S404, the distance estimation unit 231 estimates the subject distance of each of the faces detected in the step S403.

Next, in a step S405, the distance determination unit 232 determines, for each of the faces detected in the step S403, whether or not the subject distance of that face estimated in the step S404 satisfies a predetermined distance condition.

Next, in a step S406, the object-to-be-registered selecting unit 233 selects, as objects to be registered, faces that have been determined to satisfy the distance condition in the step S405 from among all the faces detected in the step S403.

Next, in a step S407, the face registration unit 206 generates registration information by associating a partial image of each of a plurality of faces selected in the step S406 with the group ID issued in the step S401. Then, the face registration unit 206 transmits the generated registration information to the face authentication server 100. In response to this, the registration information management unit 101 of the face authentication server 100 associates images that have been received as the registration information with the group ID and stores them in the storage device 54 of the face authentication server 100.

The fourth example embodiment has been described above. According to the information processing system 40 in accordance with the fourth example embodiment, a face to be registered is selected according to whether or not its subject distance satisfies the predetermined distance condition. Therefore, it is possible to exclude a person(s) whose subject distance(s) is inappropriate as that of a person to be registered, such as a person present away from the members of the group or the photographing apparatus. Therefore, it is possible to appropriately register a group to be authenticated in face authentication.

<Fifth Embodiment>

In this example embodiment, when a fluctuation distance between the positions of faces of the same person calculated from a plurality of registration images that have been successively taken at predetermined time intervals is equal to or shorter than a predetermined threshold, it is regarded as an object to be registered.

Figure 12:
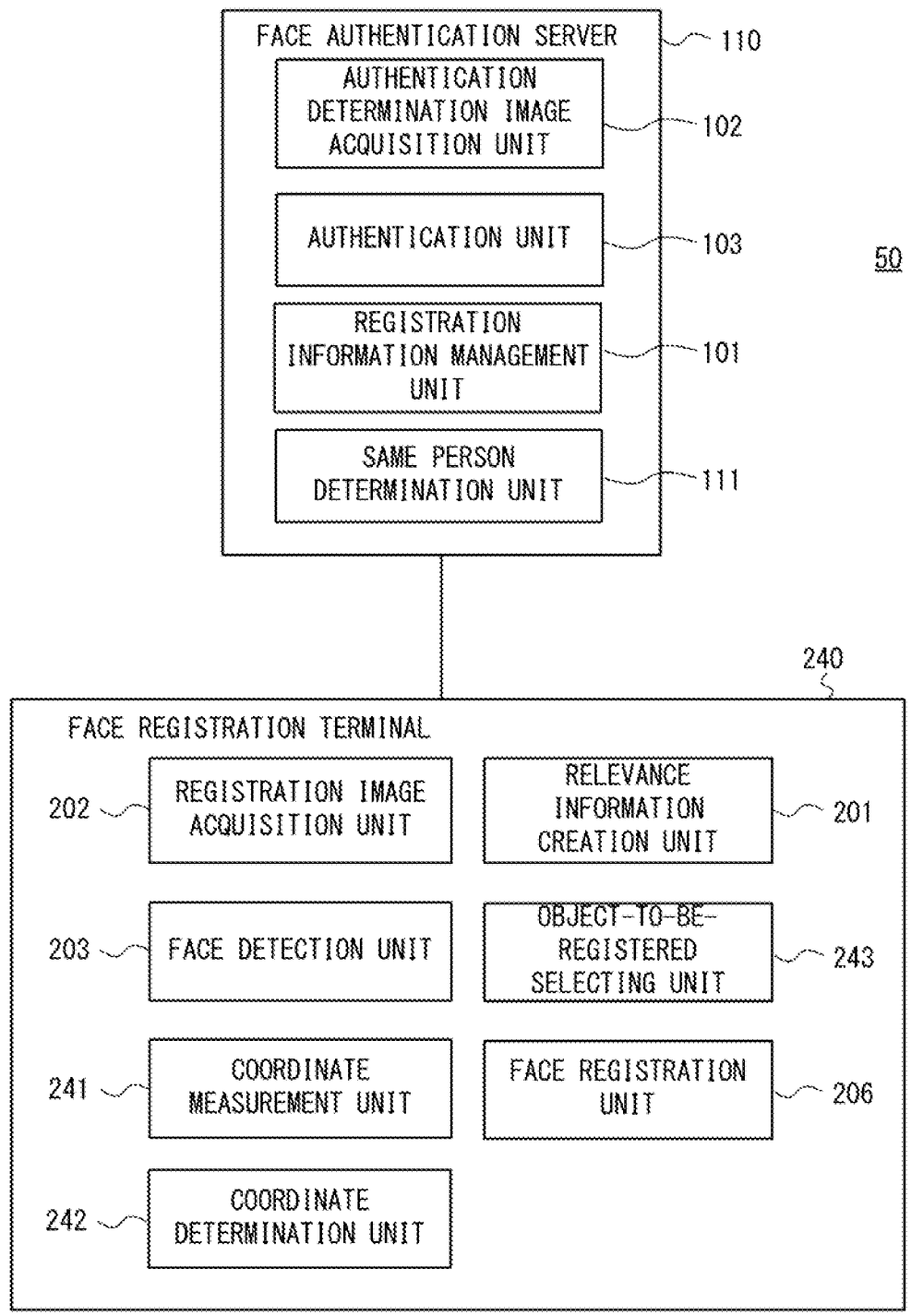
FIG. 12 is a block diagram showing an example of a configuration of an information processing system according to a fifth example embodiment.

FIG. 12 is a block diagram showing an example of a configuration of an information processing system 50 according to a fifth example embodiment. The information processing system 50 includes a face authentication server 110 and a face registration terminal 240. That is, the information processing system 50 differs from the information processing system 30 according to the third example embodiment because the face registration terminal 220 is replaced with the face registration terminal 240. The face registration terminal 240 differs from the face registration terminal 220 according to the third example embodiment in that a coordinate measurement unit 241 and a coordinate determination unit 242 are provided in place of the face line-of-sight direction determination unit 204, and an object-to-be-registered selecting unit 243 is provided in place of the object-to-be-registered selecting unit 221. Note that the coordinate determination unit 242 in this example embodiment corresponds to the determination unit 3 shown in FIG. 1. The face authentication server 110 and the face registration terminal 240 are connected to each other through a cable or a wireless network so that they can communicate with each other.

Note that a hardware configuration of the face registration terminal 240 is, for example, the same as that shown in FIG. 3. The process of each component of the face registration terminal 240 shown in FIG. 12 is performed as the processor 53 of the face registration terminal 240 loads a computer program from the memory 52 and executes the loaded program.

Parts of the configuration and operations different from those of the third example embodiment will be described hereinafter while duplicated descriptions thereof are omitted.

The registration image acquisition unit 202 according to this example embodiment acquires N registration images (N is an integer equal to or greater than two) that are successively taken at predetermined time intervals (e.g., intervals of several seconds). Note that it is assumed that the photographing areas of the N registration images are the same as each other. That is, when a series of N registration images are taken, the photographing area of the photographing apparatus is unchanged. Then, the face detection unit 203 detects faces from each of a plurality of consecutive registration images acquired by the registration image acquisition unit 202. Then, the face detection unit 203 outputs partial images of the detected faces to the same person determination unit 111 of the face authentication server 110.

The same person determination unit 111 performs matching processes between registration images for the faces detected from the plurality of consecutive registration images, and associates faces that have been determined to match each other by the matching process with each other and regards them as the face of the same person. The same person determination unit 111 outputs the result of the association to the coordinate determination unit 242 of the face registration terminal 240.

The coordinate measurement unit 241 measures the positions of all the faces detected by the face detection unit 203 in the registration image. That is, the coordinate measuring unit 241 measures the coordinates of all the faces detected by the face detecting unit 203 in the image plane. For example, the coordinate measurement unit 241 detects a position (coordinates) of a feature point corresponding to a predetermined part of the face (e.g., the central point between the eyes) by a publicly-known image recognition process and defines the detected position (coordinates) as the position of the face in the registration image.

The coordinate determination unit 242 determines whether or not a fluctuation distance between positions of the plurality of faces of the same person detected from the plurality of registration images in the registration images is equal to or shorter than a predetermined threshold. The coordinate determination unit 242 determines, for the faces of the same person in the respective registration images, identified from the result of the association by the same person determination unit 111, whether or not the variation between their positions is equal to or shorter than a predetermined threshold.

The object-to-be-registered selecting unit 243 selects, as objects to be registered, partial images of faces of persons whose fluctuation distances are determined to be equal to or shorter than the predetermined threshold by the coordinate determination unit 242. Note that the object-to-be-registered selecting unit 243 selects a partial image of one of the faces of the same person extracted from the N registration images, respectively, as the partial image of the face to be registered. For example, the object-to-be-registered selecting unit 243 selects, as the partial image of the face to be registered, a partial image of a registration image that was taken earliest among the N registration images. The object-to-be-registered selecting unit 243 performs the above-described processes for the face images of all the persons for whom association has been made by the same person determination unit 111.

It is expected that when a registration image is taken, the positions of the faces of the members of the group are substantially unchanged. Therefore, by checking the variation between the positions of faces in consecutive registration images, it is possible to exclude a face(s) of a person(s) who is inappropriate for the registration, such as a passerby.

Figure 13:
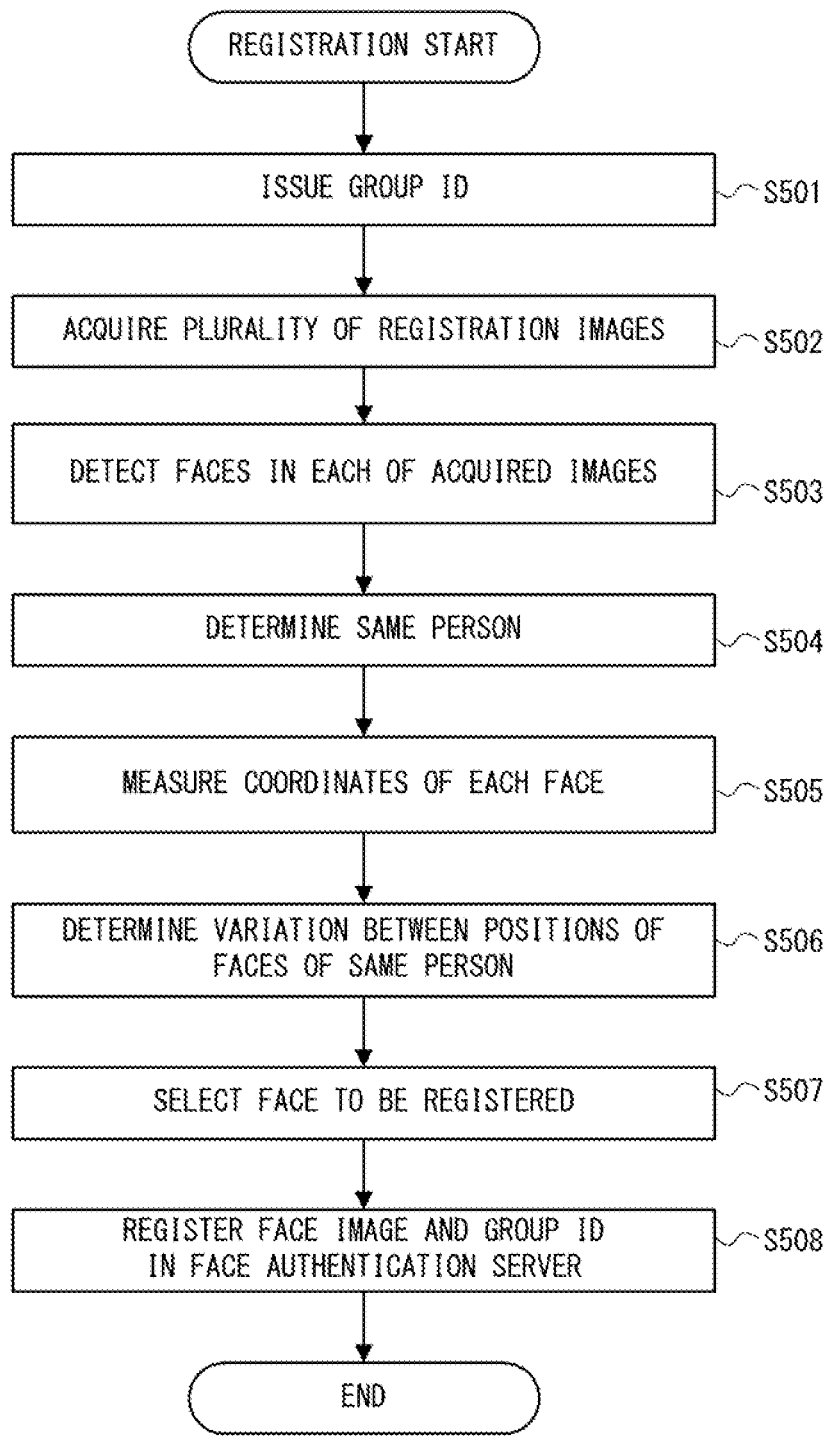
FIG. 13 is a flowchart showing an example of a registration process according to the fifth example embodiment.

Next, a flow of a registration process according to the fifth example embodiment will be described. FIG. 13 is a flowchart showing an example of a registration process according to the fifth example embodiment. The flow of the registration process is described hereinafter with reference to FIG. 13.

In a step S501, the relevance information creation unit 201 issues a new group ID.

Next, in a step S502, the registration image acquisition unit 202 acquires a plurality of registration images successively taken at predetermined time intervals (e.g., intervals of several seconds).

Next, in a step S503, the face detection unit 203 detects all the faces in the registration images acquired in the step S502. That is, the face detection unit 203 detects faces in all the registration images acquired in the step S502.

Next, in a step S504, the same person determination unit 111 performs matching processes between registration images for the faces detected in the step S503, and associates faces that have been determined to match each other by the matching process with each other and regard them as the face of the same person.

Next, in a step S505, the coordinate measuring unit 241 measures the coordinates of all the faces detected in the step S503 in the image plane.

Next, in a step S506, the coordinate determination unit 242 determines whether or not a fluctuation distance between positions of the plurality of faces of the same person detected from the plurality of registration images in the registration images is equal to or shorter than a predetermined threshold.

Next, in a step S507, the object-to-be-registered selecting unit 243 selects, as objects to be registered, faces whose fluctuation distances have been determined to satisfy the threshold condition in the step S506 from among all the faces detected in the step S503.

Next, in a step S508, the face registration unit 206 generates registration information by associating a partial image of each of a plurality of faces selected in the step S507 with the group ID issued in the step S501. Then, the face registration unit 206 transmits the generated registration information to the face authentication server 110. In response to this, the registration information management unit 101 of the face authentication server 110 associates images that have been received as the registration information with the group ID and stores them in the storage device 54 of the face authentication server 110.

The fifth example embodiment has been described above. According to the information processing system 50 in accordance with the fifth example embodiment, a face to be registered is selected according to whether the fluctuation distance of the position of the face is equal to or shorter than the predetermined threshold. Therefore, it is possible to exclude a face(s) of a person(s) who is inappropriate for the registration, such as a passerby. Therefore, it is possible to appropriately register a group to be authenticated in face authentication.

Note that the present disclosure is not limited to the above-described example embodiments and can be modified as appropriate without departing from the scope and spirit of the disclosure. For example, although the same person determination unit is disposed in the face authentication server in the above-described example embodiments, it may be disposed in the face registration terminal. That is, the processes performed by the same person determination unit may be performed in the face registration terminal. Further, some or all of the optional components in the face registration terminal may be disposed in the face authentication server. That is, the process performed by any of the components of the face registration terminal shown in FIG. 2, 5, 8, 10 or 12 may be performed in the face authentication server. Further, the methods for determining faces to be registered in the above-described example embodiments may be combined with one another as desired.

The whole or part of the example embodiments disclosed above can be described as, but not limited to, the following supplementary notes.

(Supplementary Note 1)

An information processing system comprising:
- a face detection unit configured to detect a face from an image in which a plurality of faces of persons are shown;
- a determination unit configured to determine whether or not the face detected by the face detection unit satisfies a predetermined condition; and
- a registration information generation unit configured to generate registration information, the registration information being information in which a partial image of each of a plurality of faces that have been determined to satisfy the predetermined condition is associated with an identifier identifying a group to be authenticated in face authentication.

(Supplementary Note 2)

The information processing system described in Supplementary note 1, wherein the determination unit determines, as the determination as to whether or not the predetermined condition is satisfied, whether or not a direction of a line of sight of the face detected by the face detection unit is a predetermined direction.

(Supplementary Note 3)

The information processing system described in Supplementary note 2, wherein the determination unit determines, as the determination as to whether or not the predetermined condition is satisfied, whether or not the direction of the line of sight of the face detected by the face detection unit is a predetermined direction and the face faces in the predetermined direction.

(Supplementary Note 4)

The information processing system described in Supplementary note 2 or 3, wherein
- the face detection unit detects a face from each of a plurality of images successively taken at a predetermined time interval,
- the determination unit determines whether or not a plurality of faces of the same person detected from the plurality of images satisfy the predetermined condition, and
- the registration information generation unit generates the registration information by associating a partial image of a face of a person of which the plurality of faces detected from the plurality of images are determined to satisfy the predetermined condition with the identifier.

(Supplementary Note 5)

The information processing system described in any one of Supplementary notes 1 to 4, further comprising a selection receiving unit configured to receive an instruction to select whether or not a face that is determined to satisfy the predetermined condition should be regarded as an object to be authenticated, wherein the registration information generation unit generates the registration information by associating a partial image selected according to the instruction among a plurality of partial images of respective faces that are determined to satisfy the predetermined condition with the identifier.

(Supplementary Note 6)

The information processing system described in Supplementary note 1, wherein the determination unit determines, as the determination as to whether or not the predetermined condition is satisfied, whether or not a subject distance of a face detected by the face detection unit, estimated from the detected face satisfies a distance condition.

(Supplementary Note 7)

The information processing system described in Supplementary note 1, wherein the face detection unit detects a face from each of a plurality of images successively taken at a predetermined time interval, the determination unit determines, as the determination as to whether or not the predetermined condition is satisfied, whether or not a fluctuation distance of positions of a plurality of faces of the same person detected from the plurality of images is equal to or shorter than a predetermined threshold, and the registration information generation unit generates the registration information by associating a partial image of each of faces of a plurality of persons that are determined to satisfy the predetermined condition with the identifier.

(Supplementary Note 8)

A terminal apparatus comprising:

a face detection unit configured to detect a face from an image in which a plurality of faces of persons are shown;

a determination unit configured to determine whether or not the face detected by the face detection unit satisfies a predetermined condition; and a registration information generation unit configured to generate registration information and register the generated registration information in a face authentication server, the registration information being information in which a partial image of each of a plurality of faces that have been determined to satisfy the predetermined condition is associated with an identifier identifying a group to be authenticated in face authentication.

(Supplementary Note 9)

The terminal apparatus described in Supplementary note 8, wherein the determination unit determines, as the determination as to whether or not the predetermined condition is satisfied, whether or not a direction of a line of sight of the face detected by the face detection unit is a predetermined direction.

(Supplementary Note 10)

A method for managing an object to be authenticated, comprising:

detecting a face from an image in which a plurality of faces of persons are shown;

determining whether or not the detected face satisfies a predetermined condition; and generating registration information, the registration information being information in which a partial image of each of a plurality of faces that have been determined to satisfy the predetermined condition is associated with an identifier identifying a group to be authenticated in face authentication.

(Supplementary Note 11)

A non-transitory computer readable medium storing a program for causing a computer to execute:

a face detection step of detecting a face from an image in which a plurality of faces of persons are shown;

a determination step of determining whether or not the detected face satisfies a predetermined condition; and a registration information generation step of generating registration information, the registration information being information in which a partial image of each of a plurality of faces that have been determined to satisfy the predetermined condition is associated with an identifier identifying a group to be authenticated in face authentication.

According to the present disclosure, it is possible to provide an information processing system, a terminal apparatus, a method for managing an object to be authenticated, and a program capable of efficiently registering a group to be authenticated in face authentication in the system.

The first to fifth example embodiments can be combined as desirable by one of ordinary skill in the art.

While the disclosure has been particularly shown and described with reference to example embodiments thereof, the disclosure is not limited to these example embodiments. It will be understood by those of ordinary skill in the art that various changes in form and details may be made therein without departing from the spirit and scope of the present disclosure as defined by the claims.

What is claimed is:

1. An information processing system comprising:
at least one memory storing program instructions; and
at least one processor configured to execute the instructions to:
detect a plurality of faces from an image;
determine whether or not the detected faces satisfy a predetermined condition;
output the image with overlaid frames respectively enclosing the detected faces that satisfy the predetermined condition;
receive an instruction to select one or more faces to be registered, from among the detected faces enclosed by the overlaid frames; and
generate registration information by associating partial images corresponding to the overlaid frames enclosing the selected faces as face images to be registered with an identifier.

2. The information processing system according to claim 1, wherein
the identifier is used to identify a group to be authenticated in face authentication.

3. The information processing system according to claim 1, wherein
the at least one processor is further configured to:
acquire a new face image for which a determination for face authentication is to be made; and
compare the acquired new face image with each of the face images associated with the identifier in the registration information.

4. The information processing system according to claim 1, wherein the at least one processor is further configured to:
  determine, as determination of whether or not the predetermined condition is satisfied, whether or not a subject distance of the detected faces, estimated from the detected faces, is equal to or shorter than a predetermined threshold, and
  assign no partial image of face of which the subject distance is longer than the predetermined threshold to any of groups.

5. The information processing system according to claim 1, wherein the at least one processor is further configured to:
  determine, as determination of whether or not the predetermined condition is satisfied, whether or not a direction of the detected faces is a predetermined direction; and
  generate the registration information by associating the partial image of the detected faces belonging to a group of faces with substantially the same direction of the detected faces with the identifier.

6. An information processing method comprising:
  detecting, by a processor, a plurality of faces from an image;
  determining, by the processor, whether or not the detected faces satisfy a predetermined condition;
  outputting, by the processor, the image with overlaid frames respectively enclosing the detected faces that satisfy the predetermined condition;
  receiving, by the processor, an instruction to select one or more faces to be registered, from among the detected faces enclosed by the overlaid frames; and
  generating, by the processor, registration information by associating partial images corresponding to the overlaid frames enclosing the selected faces as face images to be registered with an identifier.

7. The information processing method according to claim 6, wherein
  the identifier is used to identify a group to be authenticated in face authentication.

8. The information processing method according to claim 6, further comprising:
  acquiring, by the processor, a new face image for which a determination for face authentication is to be made; and
  comparing, by the processor, the acquired new face image with each of the face images associated with the identifier in the registration information.

9. The information processing method according to claim 6, further comprising:
  determining, by the processor and as determination of whether or not the predetermined condition is satisfied, whether or not a subject distance of the detected faces, estimated from the detected faces, is equal to or shorter than a predetermined threshold, and
  assigning, by the processor, no partial image of face of which the subject distance is longer than the predetermined threshold to any of groups.

10. The information processing method according to claim 6, further comprising:
  determining, by the processor and as determination of whether or not the predetermined condition is satisfied, whether or not a direction of the detected faces is a predetermined direction; and
  generating, by the processor, the registration information by associating the partial image of the detected faces belonging to a group of faces with substantially the same direction of the detected faces with the identifier.

11. A non-transitory computer readable medium storing a program executable by a computer to perform:
  detecting a plurality of faces from an image;
  determining whether or not the detected faces satisfy a predetermined condition;
  outputting the image with overlaid frames respectively enclosing the detected faces that satisfy the predetermined condition;
  receiving an instruction to select one or more faces to be registered, from among the detected faces enclosed by the overlaid frames; and
  generating registration information by associating partial images corresponding to the overlaid frames enclosing the selected faces as face images to be registered with an identifier.

12. The non-transitory computer readable medium according to claim 11, wherein
  the identifier is used to identify a group to be authenticated in face authentication.

13. The non-transitory computer readable medium according to claim 11, wherein the program causes the computer to further execute:
  acquiring a new face image for which a determination for face authentication is to be made; and
  comparing the acquired new face image with each of the face images associated with the identifier in the registration information.

14. The non-transitory computer readable medium according to claim 11, wherein the program causes the computer to further execute:
  determining, as determination of whether or not the predetermined condition is satisfied, whether or not a subject distance of the detected faces, estimated from the detected faces, is equal to or shorter than a predetermined threshold, and
  assigning no partial image of face of which the subject distance is longer than the predetermined threshold to any of groups.

15. The non-transitory computer readable medium according to claim 11, wherein the program causes the computer to further execute:
  determining, as determination of whether or not the predetermined condition is satisfied, whether or not a direction of the detected faces is a predetermined direction; and
  generating, the registration information by associating the partial image of the detected faces belonging to a group of faces with substantially the same direction of the detected faces with the identifier.

16. The information processing system according to claim 1, wherein
  whether or not the detected faces each satisfy the predetermined condition is determined by estimating whether or not a subject distance of each detected face is equal to or less than a predetermined threshold, such that the subject distance of each of the detected faces enclosed by the overlaid frames is equal to or less than the predetermined threshold, and such that the subject distance of each of the selected faces enclosed by the overlaid frames to which the partial images correspond is equal to or less than the predetermined threshold.

17. The information processing system according to claim 1, wherein
  whether or not the detected faces each satisfy the predetermined condition is determined by determining whether or not a face direction is a predetermined direction, such that the frame direction of each of the detected faces enclosed by the overlaid frames is the predetermined direction, and such that the frame direction of each of the selected faces enclosed by the overlaid frames to which the partial images correspond is the predetermined direction.

\* \* \* \* \*